United States Patent [19]
Chiba et al.

[11] Patent Number: 5,196,769
[45] Date of Patent: Mar. 23, 1993

[54] MOTOR CONTROL DEVICE

[76] Inventors: Hiroshi Chiba, 248-1 Hongo, Mimomi-cho, Narashino-shi; Satoshi Miura, 13-4 Miyagidai 2-chome, Funabashi-shi; Motonobu Hattori, 26-19 Mitsuwadai 3-chome, Chiba-shi; Takeshi Obata, 248-1 Hongo, Mimomi-cho, Narashino, all of Chiba, Japan

[21] Appl. No.: 776,292
[22] PCT Filed: Jun. 7, 1990
[86] PCT No.: PCT/JP90/00744
 § 371 Date: Dec. 9, 1991
 § 102(e) Date: Dec. 9, 1991
[87] PCT Pub. No.: WO90/15474
 PCT Pub. Date: Dec. 13, 1990

[30] Foreign Application Priority Data

Jun. 9, 1989 [JP] Japan .................. 1-145161

[51] Int. Cl.$^5$ .................. H02P 7/74; D01H 1/244; D01H 1/26
[52] U.S. Cl. .................. 318/39; 318/41; 318/60; 318/77; 318/86
[58] Field of Search .................. 318/39, 41, 45, 50, 318/59, 60, 86, 87, 571, 609, 610, 77

[56] References Cited

U.S. PATENT DOCUMENTS 3,600,655 8/1971 Karlin .................. 318/67
3,753,064 8/1973 Agarwal et al. .
4,446,408 5/1984 Ebermann et al. .................. 318/600
4,469,997 9/1984 Curtiss et al. .................. 318/729
4,518,899 5/1985 Wolf .................. 318/68
4,617,497 10/1986 Wolf .................. 318/78
4,829,217 5/1989 Kameyama et al. .................. 318/51
4,988,937 1/1991 Yoneda .................. 318/675

FOREIGN PATENT DOCUMENTS 60-26496 2/1985 Japan .
63-283498 11/1988 Japan .

Primary Examiner—Bentsu Ro
Attorney, Agent, or Firm—Antonelli, Terry, Stout & Kraus

[57] ABSTRACT

The present invention relates to a motor control device using an inverter or inverters, in particular, it relates to a motor control device suitable for the prevention of inertial rotation of a motor or motors or for the maintenance of synchronized operation of a plurality of motors in a service-interruption time; a DC side voltage is compared with a target voltage and a correction signal relating to the deviation voltage is added to a speed instruction for the inverter; thereby in a service-interruption time a motor can be continuously and smoothly decelerated keeping the DC side voltage of an inverter at a target voltage value. By utilizing a motor control device according to the present invention for a spinning machine etc., unevenness in thread winding or thread cut in a service interruption time can be prevented.

9 Claims, 12 Drawing Sheets

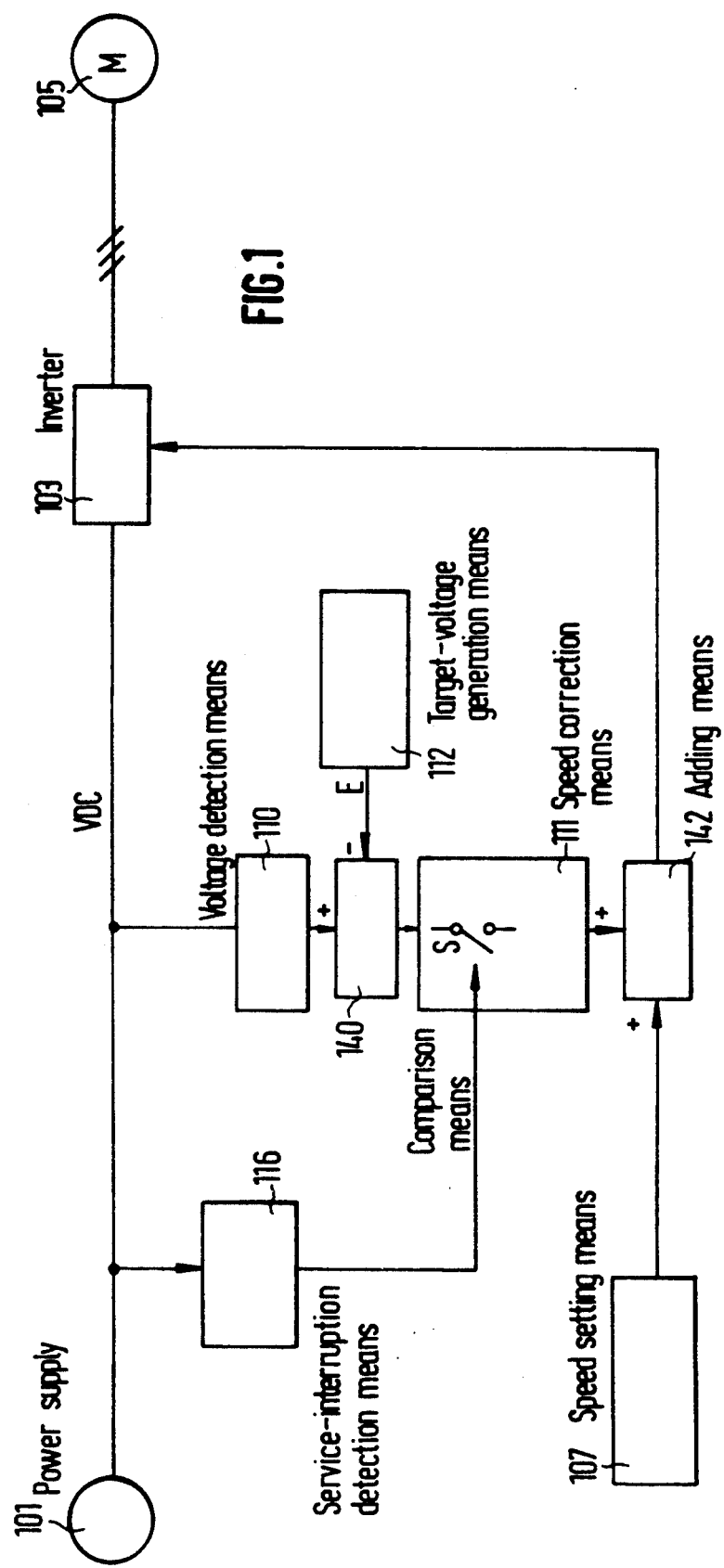

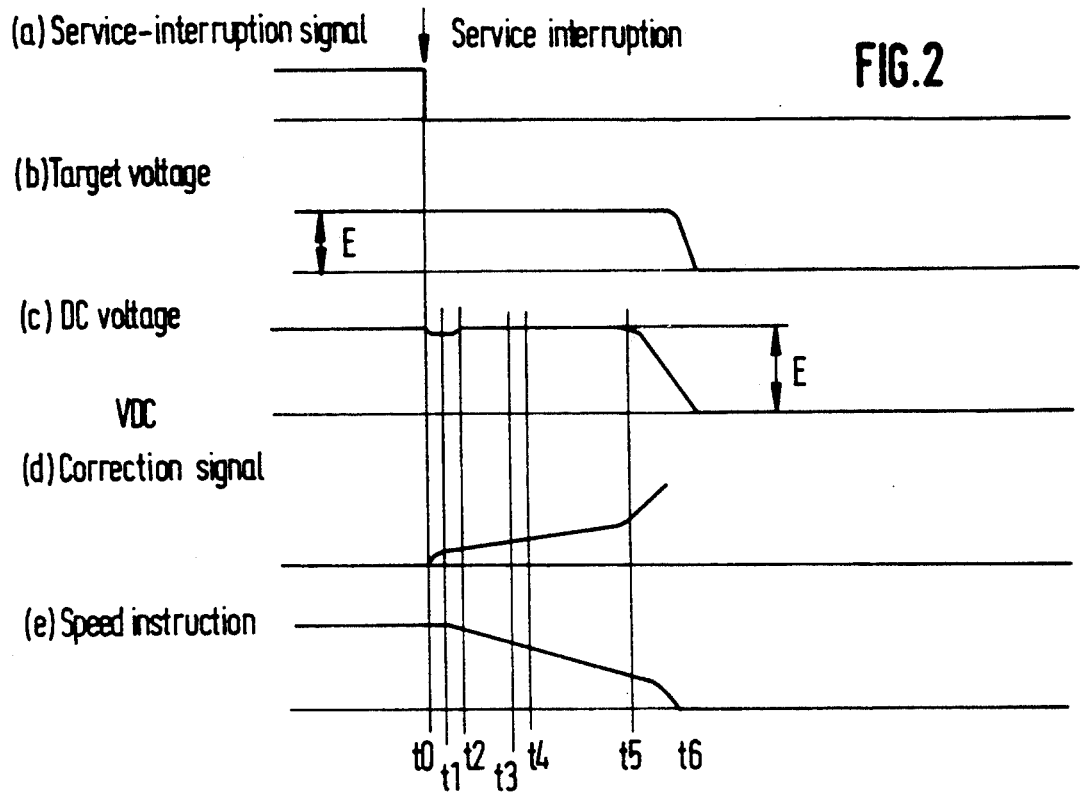
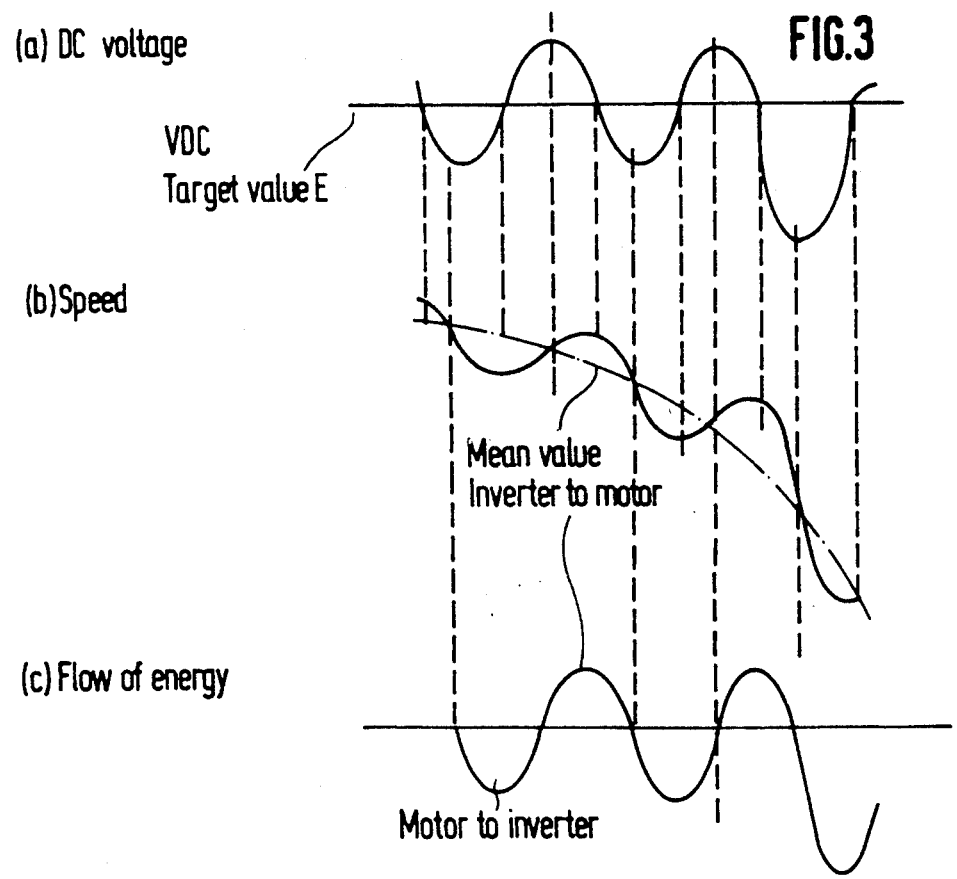

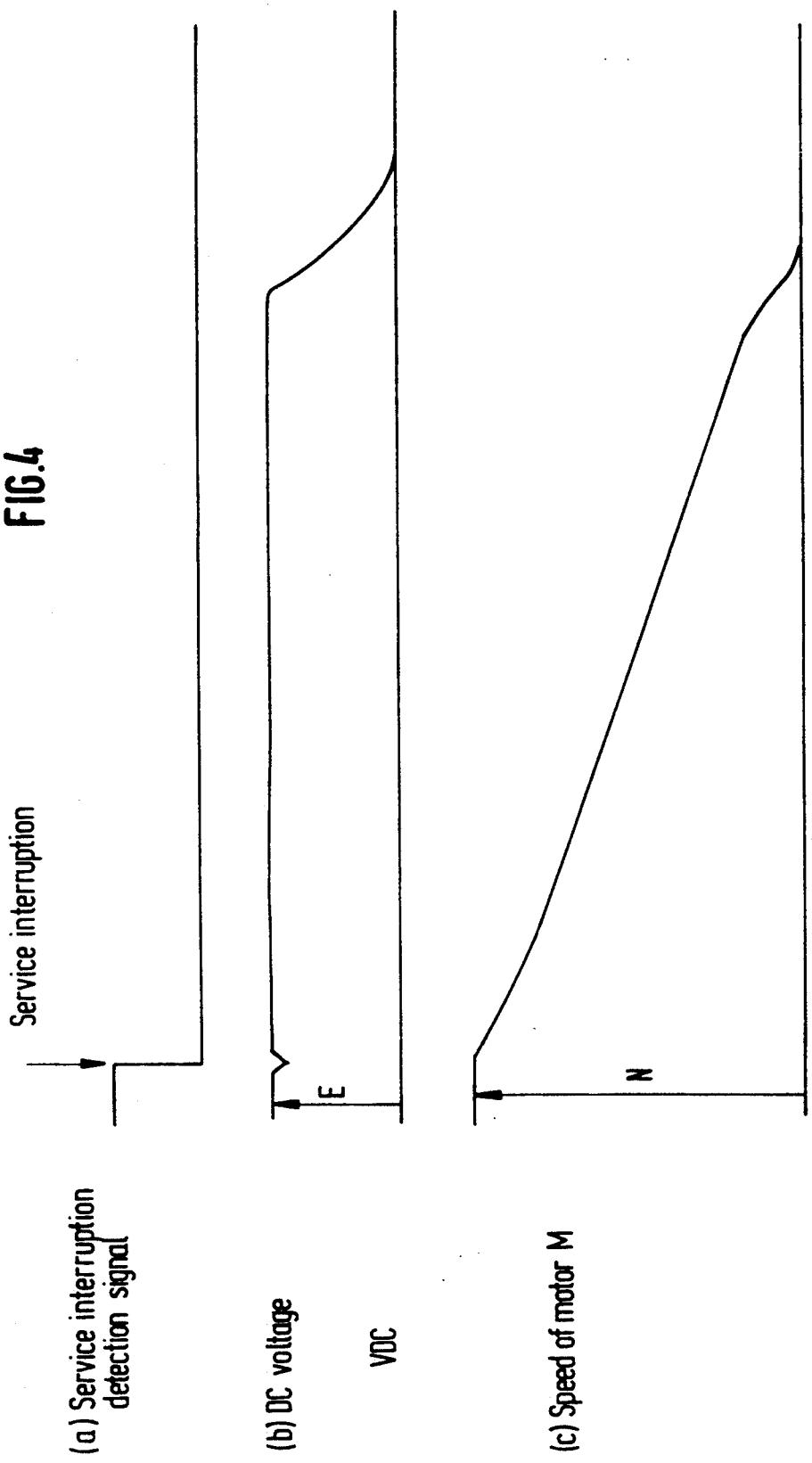

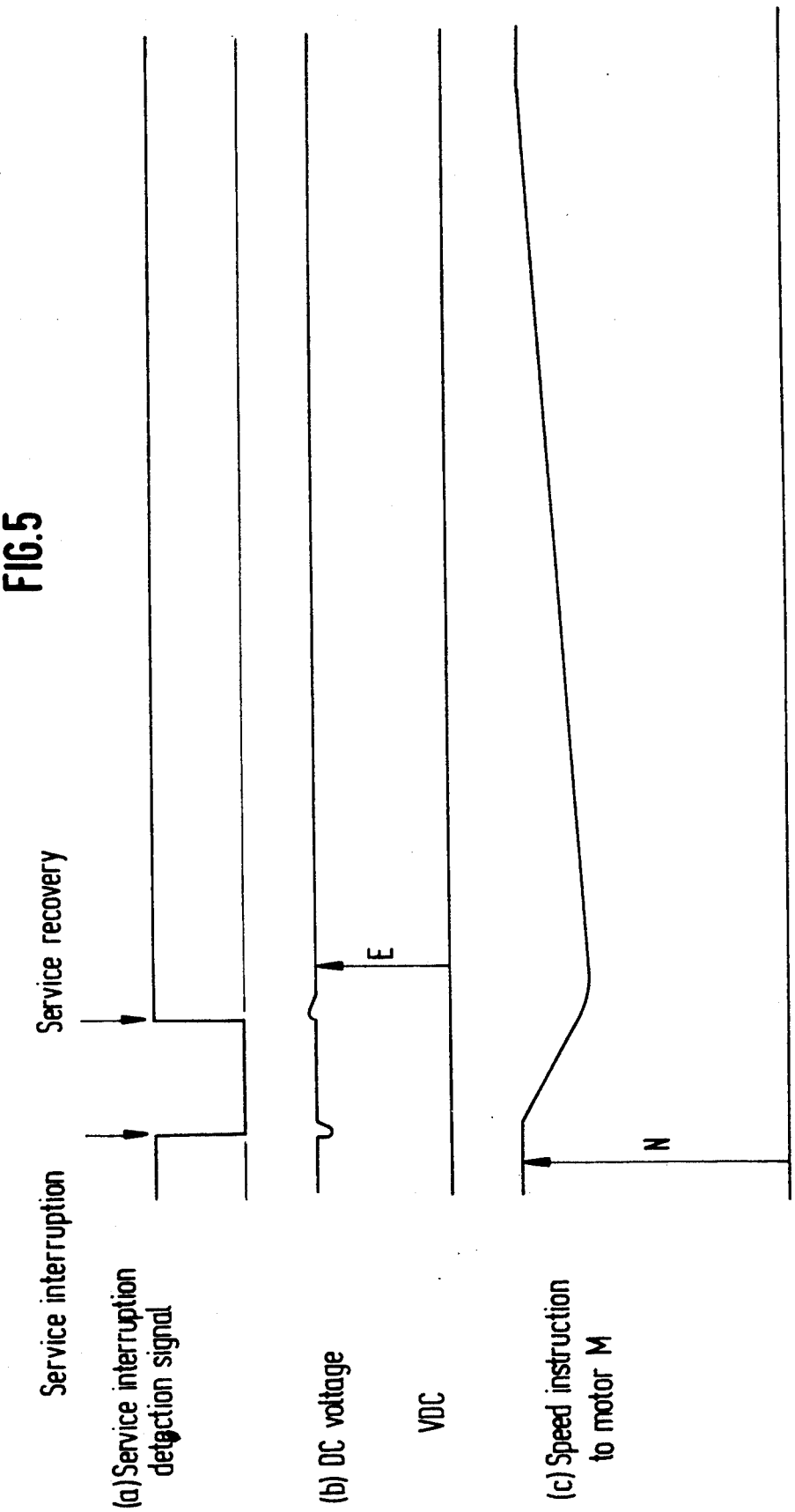

MOTOR CONTROL DEVICE

TECHNICAL FIELD

The present invention relates to a motor control device using an inverter or inverters, in particular, it relates to a motor control device which is suitable for the prevention of inertial rotation at a service interruption, or for the maintenance of synchronized operation of a plurality of motors.

BACKGROUND ART

In spinning machinery such as a spinning machine, the driving rotational speed of spindle and the driving rotational speed of other peripheral equipment must have fixed synchronous relation with each other.

Recently, with the increasing demand for energy saving or for giving flexible production functions, the use of ring spinning machines of a direct driving system has increased in which system, for each spindle, a motor is provided separately from that for driving peripheral equipment, and the motors are controlled to be driving at a variable speed.

In a spinning machine of a direct driving system, the above-mentioned fixed rotational synchronization is given by the rotational speed control of the motors for the spindles and the peripheral equipment.

In the case of a spinning machine etc. of a direct driving system, while a motor for driving a spindle and a motor for driving other peripheral equipment are operated by a power supply, a fixed synchronous relation in rotational speed is maintained, but if the supply of electricity from the power supply is interrupted by a trouble etc., that is, in a service interruption, the operation of an inverter cannot be continued and motors are rotated by iner.ia making the speed control impossible; therefore, during a period of time, from a normal operating condition till each of the parts being driven comes to a stop, the above-mentioned synchronous relation can be broken. As a result, there is a probability that a defect is produced in a product or thread cut occurs.

An idea to continue the speed control of a motor even in the case of a service interruption by continuing the operation of an inverter utilizing the regenerative power from the motor is shown in a Japanese patent, laid open No. 62393/86. In the disclosed idea, the following operation is performed: in a service interruption, an instruction to rapidly lower the output frequency of an inverter is issued; when the voltage on the DC side of the inverter is made to an overvoltage with the feedback of the regenerative power, the instruction is suspended to stop the feedback of the regenerative power; when the voltage on the DC side of the inverter is lowered by the stop of the feedback the instruction is issued again, and the feedback operation of regenerative power is performed; such an operation is repeated until the motor is decelerated to a certain speed. Therefore, every time when an instruction is issued, deceleration is performed at the same deceleration rate and the instruction is suspended when the voltage on the DC side of the inverter is made to an overvoltage by regeneration; thus rapid deceleration of the motor and the stop of deceleration is repeated (ON/OFF control), so that a problem results in this case is that smooth deceleration of the motor cannot be performed. Because of this, when the technique is applied to spinning machinery such as spinning machines, there occurs a problem of thread cut or unevenness in thread winding caused by off and on speed change. Since the deceleration rate is set to be large, the quantity of regeneration becomes large, so that the voltage on the DC side rises so high as to induce over-excitation, and a lot of regenerative energy is consumed in the motor, which shortens the period of time in which the voltage of the DC side can be maintained, and a problem occurs that if the duration of time of a service interruption becomes long, restarting of the motor becomes difficult.

SUMMARY OF THE INVENTION

An object of the invention is to provide a motor control device which is capable of controlling the rotation of a motor to be decelerated continuously and smoothly even when a service interruption occurs.

A motor control device according to the present invention comprises: an inverter whose DC side is connected to a power supply, and the AC side thereof is connected to at least a unit of a motor; a speed setting means for giving a speed instruction to the inverter; a service-interruption detection means for detecting a service interruption of the above-mentioned power supply; a voltage detection means for detecting a DC-side voltage of the inverter; a target-voltage generation means for generating a target voltage; a comparison means for comparing the voltage detected by the voltage detection means and the target voltage and for outputting the deviation voltage; and a speed correction means for generating a speed correction signal which is continuously changed in connection with the output of the comparison means; and a DC-side voltage of the inverter is kept at a target voltage value by adding with an adder the output of the speed correction means to the output of the speed setting means for continuously changing the output of the speed setting means, on the direction of a service interruption by the service-interruption detection means. In the motor control device according to the present invention a motor and an inverter are connected even in a service interruption, and the voltage of the DC circuit of the inverter is maintained at a proper value and the control is continued by the regenerative power; therefore the inertial operation of the motor is prevented and the speed is corrected by the speed correction means corresponding to the deviation voltage between the target voltage and the detected voltage, so that the rotation of the motor can be continuously and smoothly decelerated.

BRIEF DESCRIPTION OF THE DRAWINGS

FIG. 1 is a block diagram showing a basic constitution of the present invention;

FIG. 2 is a time chart showing a DC circuit voltage and a speed instruction in a service interruption according to the present invention;

FIG. 3 shows waveform diagrams of a voltage and a frequency in a service interruption according to the present invention;

FIG. 4 shows time charts of a DC circuit voltage and the rotational speed of a motor in a service interruption in an embodiment of the present invention;

FIG. 5 shows time charts of a DC circuit voltage and the rotational speed of a motor in a service interruption according to the present invention;

DESCRIPTION OF PREFERRED EMBODIMENTS

Figure 6:
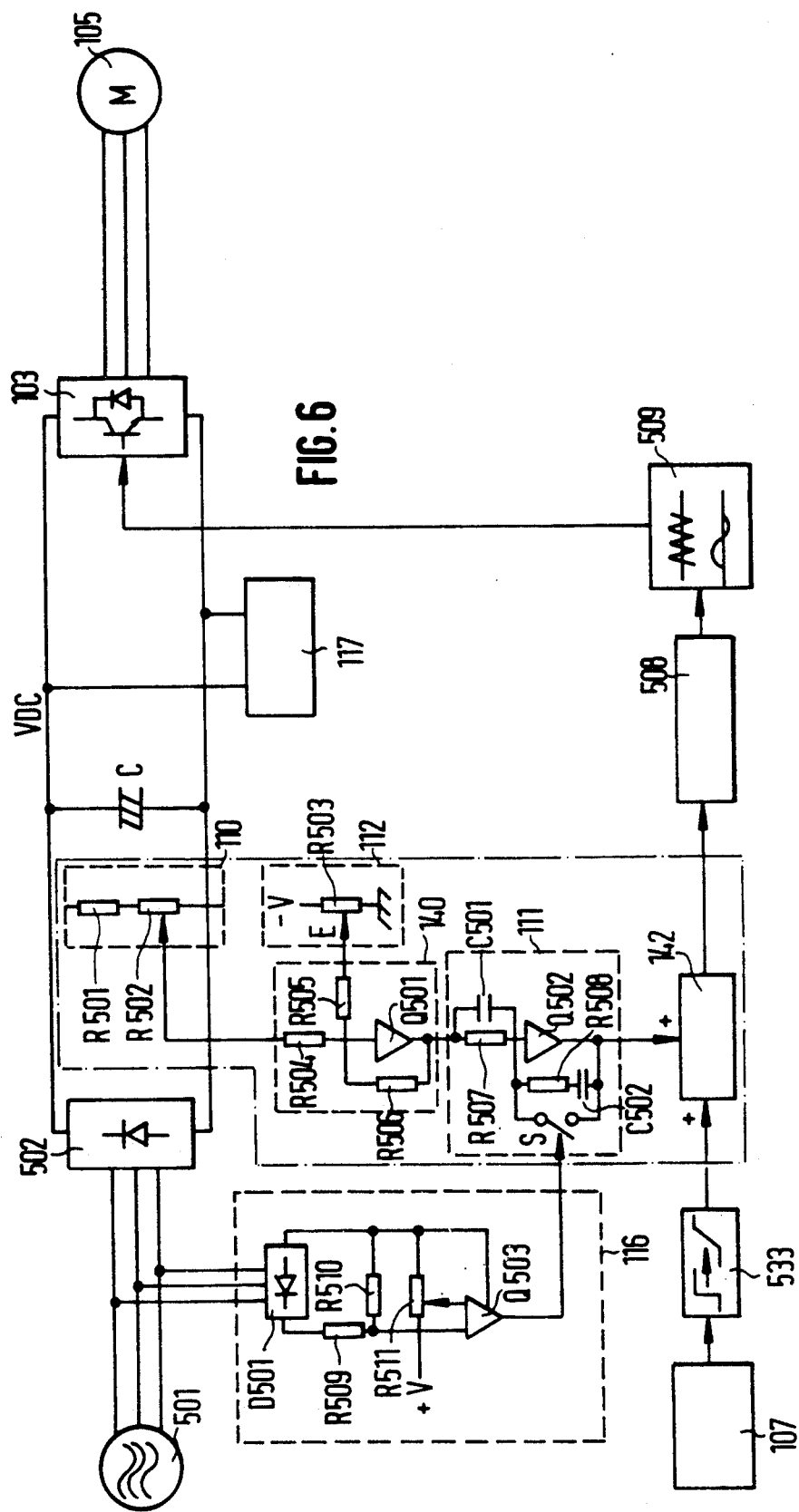
FIG. 6 is a block diagram showing a concrete constitution of a first embodiment of the present invention.

The present invention and the embodiments will be explained referring to FIG. 1 to FIG. 13.

The basic constitution of the present invention will be explained referring to FIG. 1 to FIG. 5.

FIG. 1 shows the basic constitution of the present invention. The DC side of an inverter 103 is connected to a power supply 101 and a motor 105 is connected to the AC side of it. A service-interruption detection means 116 for detecting a service interruption is in connection to the power supply 101. A voltage detection means 110 for detecting the voltage on the DC side (hereinafter referred to as DC circuit) of the inverter 103 is connected to the DC side of the inverter 103. To the voltage detection means 110, a comparison means 140 is connected which compares the voltage detected by the voltage detection means 110 with a target voltage produced by a target voltage generation means 112 for generating a target voltage for the DC circuit, and outputs the deviation voltage. The output of the comparison means 140 is connected to a speed correction means 111 provided with a switch means S which is activated when a service interruption is detected by the service-interruption detection means 116. The output of the speed correction means 111 is connected to an adding means 142 which is connected between a speed setting means 107 and the inverter 103.

The operation in the constitution as shown in FIG. 1 will be explained referring to FIG. 2 to FIG. 5.

The voltage detection means 110 detects the DC circuit voltage of the inverter 103; the comparison means 140 compares the output of the voltage detection means 110 with a target voltage E generated by the target voltage generation means 112, and outputs the deviation voltage. The speed correction means 111 outputs a speed correction signal which varies continuously in connection with the deviation voltage. The speed correction signal is arranged to be generated when a service interruption is detected by the service-interruption detection means 116. In other words, in the speed correction means, a switch S is provided which performs ON/OFF operation according to the signal of the service-interruption detection means 116. The switch S can be the one as described in the following: the switch S is provided between the output of the comparison means 140 and the input of the speed correction means 111, and it is made ON by the output of the service-interruption detection means 116 in the case of a service interruption to supply the output of the comparison means 140 to the speed correction means 111; it is also provided for short-circuiting the input and the output of the speed correction means 111 in normal time, and in a service interruption it is made OFF to make the speed correction means 111 workable. In the case of the occurrence of a service interruption, with the ON or OFF of the switch S, the speed correction means is made to be capable of outputting a speed correction signal. The speed setting means 107 generates an output to rotate the motor 105 at a specified speed. In a service interruption, the output of the speed correction means 111 is added to the output of the speed setting means 107 through the adding means 142; thereby, the output of the speed setting means 107 is continuously corrected and the speed instruction is continuously decreased, and the motor 105 is continuously decelerated following the instruction.

The states of the voltages and the speed after the occurrence of a service interruption will be explained referring to FIG. 2 and FIG. 3. As shown in FIG. 2, wherein a service interruption occurs, the output of the service-interruption detection means 116 falls stepwise, and the trailing edge is output as a low level service-interruption signal (FIG. 2(a)). The switch S is activated by the signal, and the speed correction means 111 generates an output in connection with the above-mentioned deviation voltage.

On the other hand, as shown in FIG. 2, the DC voltage VDC starts to fall simultaneously with the time of occurrence of a service interruption t0, and the detected voltage by the voltage detection means 110 becomes lower than the target voltage E given by the target voltage setting means 112 (FIG. 2(c), t0 to t2), so that the deviation voltage between the detected voltage and the target voltage becomes a negative value, and the voltage is input to the speed correction means 111.

The operation after the occurrence of a service interruption is maintained by supplying the regenerated power through the inverter 103 to each constituent element by way of the control power supply 117 (omitted in FIG. 1). Detailed description will be given below. When the deviation voltage is input to the speed correction means 111, it outputs a specified speed correction value obtained by integrating the deviation voltage (FIG. 2(d)); the value is added to the speed instruction from the speed setting means 107; therefore, if a negative deviation is input as mentioned in the above, a correction value corresponding to the deviation voltage is subtracted from the speed instruction given by the speed setting means 107, and the speed instruction for the inverter 103 decreases (FIG. 2(e)).

In an early stage of a service interruption, the number of revolutions of the motor 105 is kept almost as it was by an inertial force, so that the inverter 103 starts regenerative operation after t1 sec from the moment of occurrence of a service interruption caused by the decrease of speed instruction as mentioned in the above, and after t2 sec from the occurrence of the service interruption a state is obtained where the DC voltage E is generated (FIG. 2(c), t2 to t5) by the regenerative power from the motor 105. During such a period of time, the motor is decelerated keeping the DC voltage E, and when the speed is lowered till a certain value, it becomes impossible to generate regenerative power and reaches a stop (FIG. 2(e), t0). The voltage, the speed and the flow of energy during the decelerating operation in t3 to t4 will be explained referring to FIG. 3.

In the present embodiment, since the comparison means 140 and the speed correction means 111 function as a feedback system, as shown in FIG. 3(a), they operate as a feedback control system to make the DC voltage VDC converge at the target voltage E.

In other words as shown in FIG. 2(b), when the deceleration of the motor 105 grows larger than the speed instruction, the regenerative power falls short of keeping the DC voltage VDC and the VDC is lowered much to be lower than the target voltage E, so that the decreasing speed of the speed instruction is decelerated by the decrease in correction value; on the other hand when the deceleration of the motor 105 is slower than the speed instruction the regenerative power becomes surplus, and the DC voltage VDC rises much to be higher than the target voltage E, so that the correction value increases and the decreasing speed of the speed instruction is accelerated. Thereby, the energy flow between the inverter and the motor becomes as shown in FIG. 2(c). Thus the feedback control is executed in the form in which the DC voltage VDC is made to converge at the target voltage E by the increases or the decrease of the correction value, and the motor 105, keeping the DC voltage E, is gradually decelerated with the decrease of rotating energy being consumed in the heating of windings, etc. in the flow of energy as shown in the above. When the speed is lowered much, the quantity of regenerative energy is decreased and the DC voltage begins to fall without being able to maintain the target value. Owing to this, the deviation voltage between the DC voltage and the target value becomes large, and the correction quantity for the speed instruction is increased and the deceleration for the motor is expedited to bring it to a stop.

As described in the above, in the present embodiment a correction signal is obtained by integrating the deviation voltage, so that the correction quantity can be made large by the accumulation of the deviation voltage, that is, the voltage fluctuation can be decreased and the speed stabilization can be achieved. After the occurrence of a service interruption, a shown in FIG. 4, the DC voltage VDC can be kept at the level of the target voltage E for a long time; owing to this even after the occurrence of a service interruption the control of the inverter 103 can be continuously performed; thereby the motor 105 can be decelerated continuously and smoothly while being controlled by the inverter 103.

As described in the above, after the occurrence of a service interruption, energy is regenerated by the motor 105, and the DC voltage VDC is kept at the level of the target voltage E for a long time by a feedback control; thereby the control of the inverter 103 is continuously performed and the electrical relation between the motor 105 and the inverter 103 is maintained; therefore, in the case of a service interruption, after the service is recovered the resumption of operation is easy. After the recovery of the service, the generation of the correction signal by the speed correction means is stopped, so that the motor is accelerated smoothly at a specified rate as shown in FIG. 5.

A first embodiment of the present invention will be explained referring to FIG. 6.

In the present embodiment, the invention is applied to a motor control device to be connected to an AC circuit.

In the present embodiment, a power supply 501 is the AC commercial power supply.

The present invention comprises the following, an addition to the constitution shown in FIG. 1: a converter 502 connected between the inverter 103 and the power supply 501, a smoothing capacitor C connected to the DC circuit of the inverter 103, and an oscillator 508 and a PWM converter 509 being connected in series which are connected between a speed setting means 107 and an adding means 142.

In a voltage detector 116 in the present embodiment, resistors R 509 and R 510 connected in series to each other are connected to the power supply 501 through a rectifier D 501. The junction point of resistors R 509 and R 510 is connected to one of the inputs of a comparator Q 503, and the other input of the comparator Q 503 is connected to a resistor R 511 which generates a criterion voltage whose another end is connected to the positive side of a control power supply 117.

The comparator Q 503 compares a voltage between both ends of the resistor 510 (a divided voltage value of the recited power supply voltage) and the criterion voltage set by the resistor R 511, and detects a service interruption by detecting the voltage between both ends of the resistor R 510 to be lower than the criterion voltage set by the resistor R 511, and generates a signal. In the present embodiment, the comparator Q 503 generates a high level signal in the normal voltage time, and in the lower voltage time, such as a service-interruption time, it generates a low level signal as a service-interruption detection signal.

A voltage detector 110 is composed of resistors R 501 and R 502 connected in series to each other, and the output is taken out from the resistor 502.

A target voltage generating means 112 comprises a resistor R 503 whose one end is grounded and the other end is connected to the negative side of the control power supply 117, and the target voltage is obtained by dividing the voltage applied to the R 503.

The comparison means 140 comprises: an amplifier Q 501; a resistor R 504 connected to the input terminal of the amplifier Q 501 and to the voltage detector 110; and a resistor R 505 connected to the input terminal of the amplifier Q 501 and to the target voltage generation means 112. The amplifier Q 501 further comprises a negative feedback resistor R 506 between the input terminal and the output terminal. The output of the voltage detector 110 and the output of the target voltage generation means 112 are superimposed at the junction point of resistors R 504 and R 505, and the deviation voltage between them is input to the amplifier Q 501 and amplified to be output to the speed corrector 111.

In the present embodiment, the speed corrector 111 comprises an amplifier Q 502, and a resistor R 507, as a proportional element, and a capacitor C 501, as a differential element, being connected in parallel to each other are connected between the output terminal of the comparison means 140 and the input terminal of the amplifier Q 502. A resistor R 508 and a capacitor C 502 connected in series to each other are connected between the input terminal and the output terminal of the amplifier Q 502 as a proportional integration element, and further a switch S is connected in parallel to the proportional integration element. The switch S is normally made ON by the output of the comparator Q 503 in the service-interruption detection circuit 116, and when the voltage is lowered as in the case of a service interruption, it is made OFF.

In the present embodiment, in the normal operation, DC power having a DC voltage E is supplied to the inverter 103 from the commercial power supply 501 through the converter 502. At this time, the inverter 103 drives the motor 105 in a number of revolution corresponding to a speed instruction issued from the speed setter 107. In this case, the instruction from the speed setter 107 is changed to a ramp-shaped signal in a mild acceleration/deceleration circuit 533, and the magnitude of the signal at each point of time in the ramp part is proportional to an output frequency. A specified frequency signal is input to the PWM converter 509 from the oscillator 508 by the above-mentioned signal, and from the PWM converter 509 a PWM signal is generated which makes the inverter 103 output an AC power having a voltage V1 and a frequency F1 corresponding to the ramp signal (speed instruction); by the PWM signal, the inverter 103 is operated and the motor 105 is driven in a number of revolution corresponding to a speed instruction.

In this embodiment, since a PWM system inverter is used, there is no need to control DC voltage VDC; therefore, the voltage VDC is kept at an almost constant voltage which is obtained by simply converting (full wave rectification) an AC voltage received from the commercial power supply 501.

When a service interruption occurs, the DC voltage VDC begins to fall, and the deviation voltage between a detected voltage by the voltage detector 110 and the target voltage becomes a negative value, and it is input to the speed corrector 111.

When the deviation voltage is input to the speed corrector 111, the corrector works to output a specified speed correction value obtained in processing the deviation voltage by proportion, integration or differentiation. The output is added to the speed instruction from the speed setter 107 in the adder 142; when a negative deviation voltage is input, a correction quantity corresponding to the deviation voltage is subtracted from the speed instruction given by the speed setter 507, and the speed instruction for the oscillator 508 is decreased. Owing to this, the motor 105 is made to be in a regenerative condition, and the speed instruction is corrected in relation to the deviation voltage between the voltage of the DC circuit and the target voltage, so that, similar to the case of basic constitution, the motor 105 is decelerated continuously and smoothly in the state where the voltage of the DC circuit is kept at the target voltage value E. The operations after the occurrence of a service interruption are sustained by the control power supply 117 connected to the DC circuit.

In the present embodiment, it is possible to adopt a constitution in which the setting of a target voltage is performed by a microcomputer (CPU). In other words, it is possible to have a constitution in which the functions to be performed by the voltage detector 110, the target voltage setter 112, the mild acceleration/deceleration circuit 533, the adder 142, the oscillator 508, and the PWM converter 509 are executed by the microcomputer (CPU).

Figure 7:
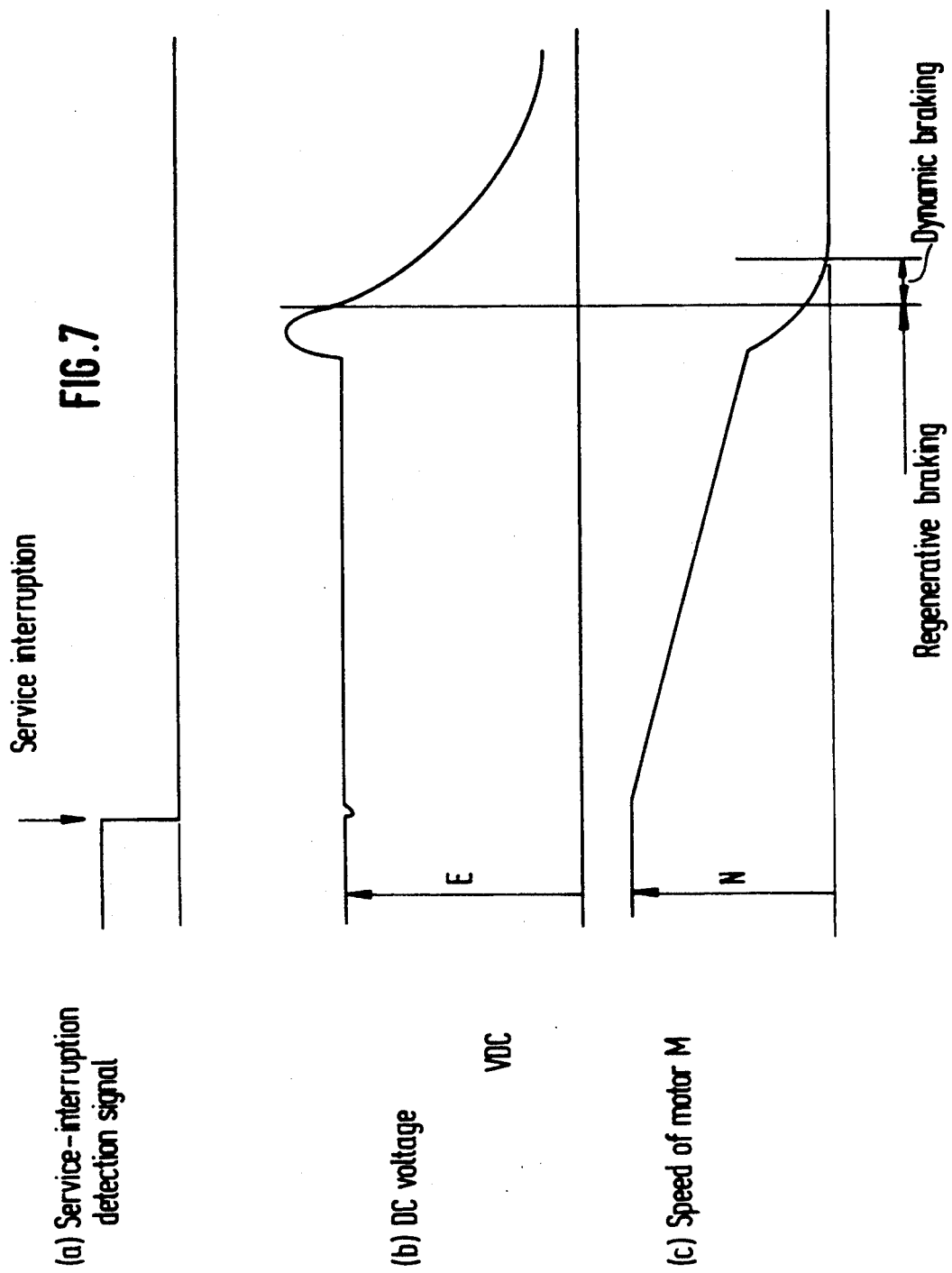
FIG. 7 shows time charts of a DC circuit voltage and the rotational speed of a motor in the case where a braking effect is improved in a service interruption in the present invention.

In the above constitution, during a deceleration process in a service interrupt in, the microcomputer monitors the speed of the motor 105 (or speed instruction) and when the speed falls to a certain low sped region it resets the target voltage of the DC circuit to a hither value as shown in FIG. 7. Thereupon, the deviation voltage from the detected value is suddenly increased, so that the microcomputer makes the speed deceleration quantity larger. In other words, it controls to decelerate the motor at a larger rate to make the feedback quantity of the regenerative energy large and to push the DC voltage up to a new target voltage level as shown in FIG. 7(b). At this time, the energy increased by square times of a voltage ratio is accumulated in the capacitor C, and the speed of the motor 105 falls to a very low level because of a sudden deceleration as shown in FIG. 7(c). At this time, the microcomputer CPU applies dynamic brakes (DC brake) to the motor through the inverter utilizing increased energy in the capacitor C. Thereby, the motor 105 is securely stopped.

Figure 8:
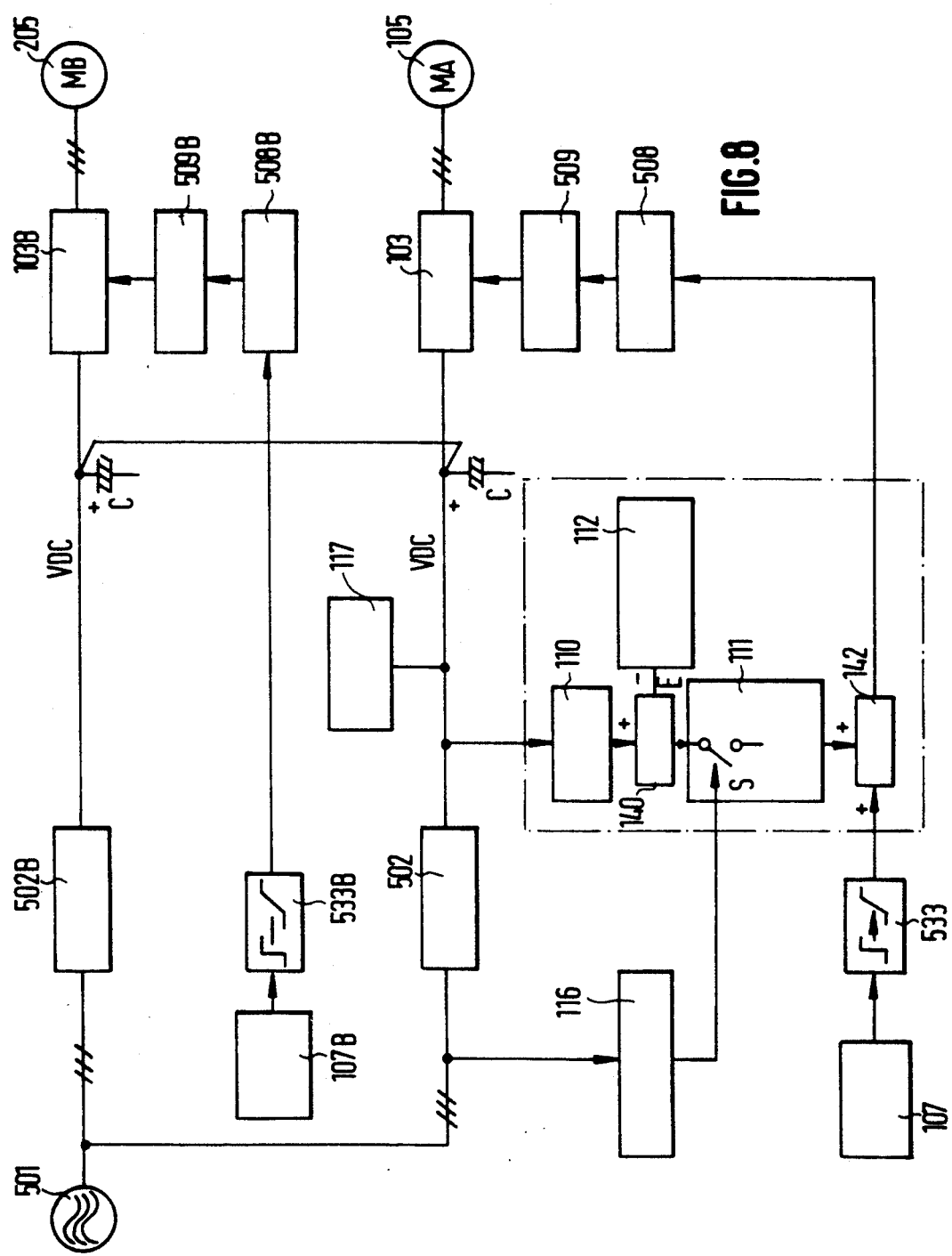
FIG. 8 is a block diagram showing the constitution of a second embodiment of the present invention.

A second embodiment according to the present invention will be explained referring to FIG. 8. In FIG. 8, similar symbols are given to similar constituent elements to those in the firsts embodiment. In the present embodiment, the DC circuits of an "A" system and a "B" system having separate main circuits and control circuits to be able to operate each system independently from each other are connected to each other to form a common DC circuit, and the regenerative energy of a system having larger inertial energy is arranged to be supplied to the other system.

In the present invention, a system which has large inertial energy of a load and a motor and whose energy which can be regenerated for the duration of a service interruption is larger than the consumption energy for continuing the operation of a "B" system is selected to be an "A" system, and the "A" system has similar constitution to that of the first embodiment.

The "B" system has a power supply 501 in common with the "A" system, and comprises a converter 502B connected to the power supply 501, and an inverter 103B having a DC circuit connected to the converter 502B. A motor 205 is connected to the AC side of the inverter 103B, and a smoothing capacitor C is connected to the DC side of the inverter 103B. The control circuit of the inverter 103B comprises: a speed setter 107B. a mild acceleration/deceleration circuit 533B connected in series to the output of the speed setter 107B, an oscillator 508B, and a PWM converter 509B; the output of the PWM converter 509B is connected to the inverter 103B.

In the present embodiment, the DC circuit of the inverter 103 in the "A" system and the DC circuit of the inverter 103B of the "B" system are connected to each other to form a common DC circuit.

Owing to this arrangement, the "A" system can feedback regenerated energy to the common DC circuit when a power supply is interrupted.

When a service interruption occurs in the "A" system, similar to the first embodiment, a negative feedback control is executed to make the voltage of the common DC circuit converge at a target voltage, and continuous and smooth deceleration of the motor is performed. On the other hand, the "B" system independently comprises: a speed setting circuit 507B, the mild acceleration/deceleration control circuit 533B, the oscillator circuit 508B, and the PWM converter circuit 509B; therefore, the "B" system is operated independently in a different way from the "A" system. That is, when the operation is continued in a motor region, the energy fed back from the "A" system can be utilized for the continuation of the operation of the "B" system.

When the regenerative energy of the "A" system is large, a plurality of "B" systems can be connected to the "A" system in the range where the energy of the "A" system can afford to support "B" systems. In place of the converters 502 and 502B of the "A" system and the "B" system a common converter can be used.

Figure 9:
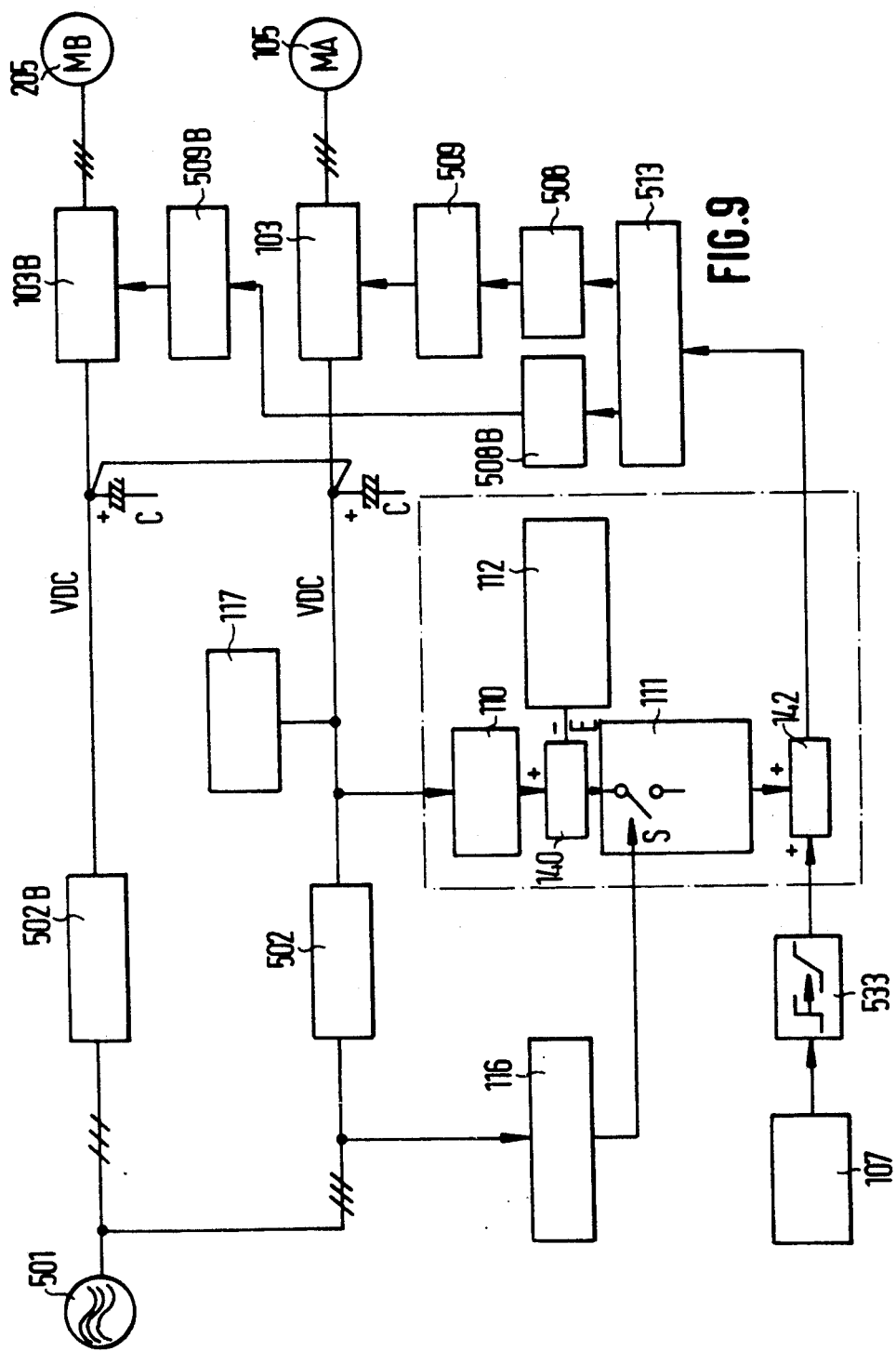
FIG. 9 is a block diagram showing the constitution of a third embodiment of the present invention.

A third embodiment according to the present invention will be explained referring to FIG. 9. In the present embodiment, an "A" system comprises a speed ratio circuit 513 connected between an adder 142 and an oscillator 508, and an oscillator 508B and a PWM converter circuit 509B of a "B" system are connected to the speed ratio circuit 513.

The constitution of the "A" system is similar to that of the second embodiment except that the speed ratio circuit 513 is connected between the adder 142 and the oscillator 508. The constitution of the "B" system is similar to that of the second embodiment except that the oscillator circuit 508B and the PWM converter circuit 509B are connected to the speed ratio circuit 513 of the "A" system. In the present embodiment, the speed ratio circuit 513 devices the speed ratio of a motor MB 205 in the "B" system to a motor MA 105 in the "A" system, and the motor MB 205 and the motor MA 105 are operated at a specified speed ratio (synchronized operation).

In the present embodiment, in the case of a power interruption, the feedback of regenerative energy can be done by either of the systems, and the feedback quantity of regenerative energy, that is, the deceleration rate of motors MA and MB in both systems A and B, is automatically controlled to make the voltage of the common DC circuit, regarding A and B systems as a single system, converge at a target voltage value. The operations of motors MA and MB in both systems are continued keeping a specified speed ratio by the speed ratio circuit 513.

Figure 10:
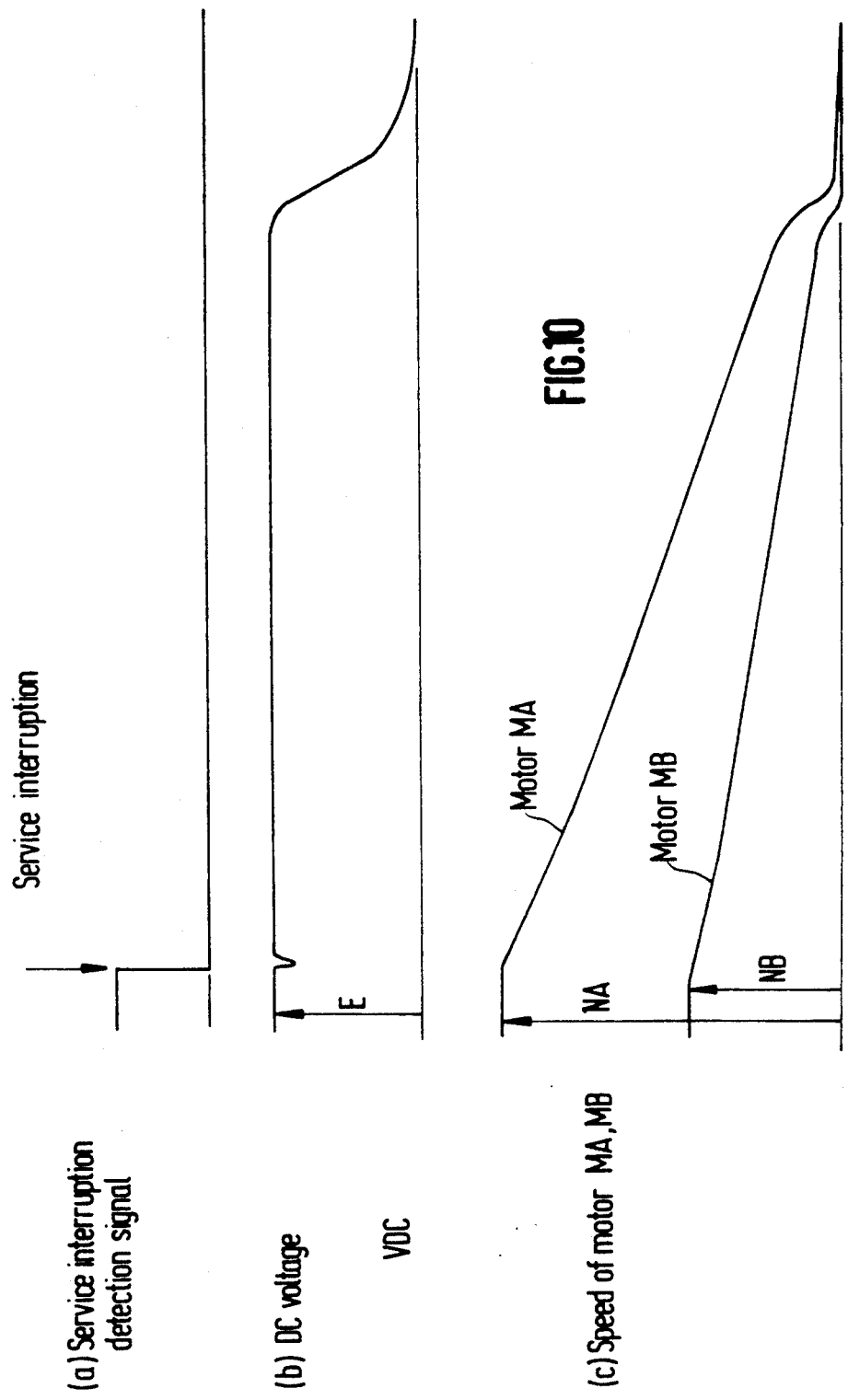
FIG. 10 shows time charts of a DC circuit voltage and the rotational speed of each of the motors in the present embodiment.

In FIG. 10, the relation between the DC voltage VDC and the sped of motors MA and MB during the period of time of continuation of synchronized operation in a service operation. After the occurrence of a service interruption, the motors in both systems are smoothly decelerated in synchronization with each other keeping the VDC of the common DC circuit at a target value. The synchronized operation is normally performed till a low speed state.

Figure 11:
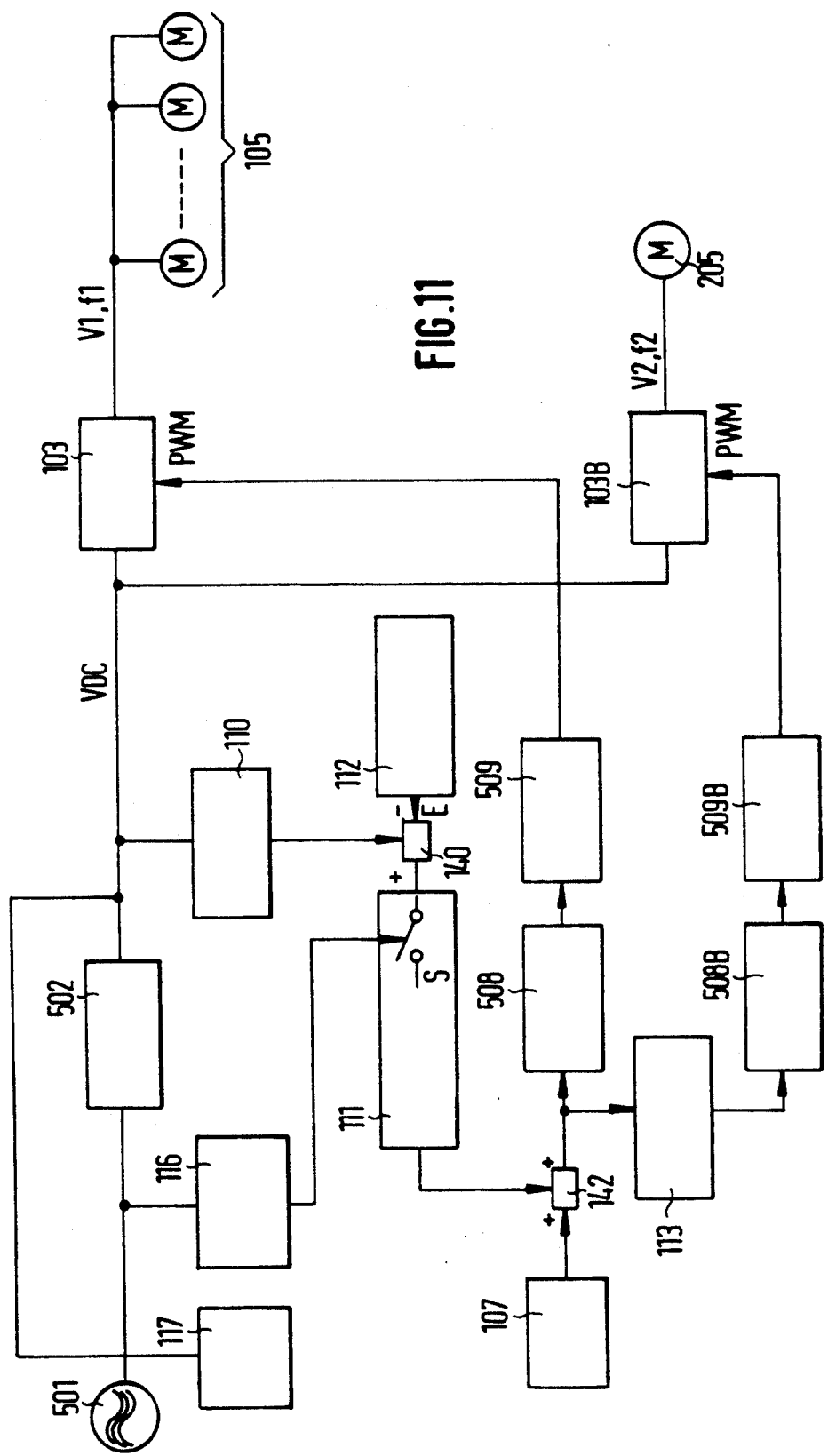
FIG. 11 is a block diagram showing the basic constitution of a fourth embodiment of the present invention.

A fourth embodiment according to the present invention will be explained referring to FIG. 11. The present embodiment is an example in which the present invention is applied to a motor control device for a ring spinning machine. In the present embodiment, a motor 105 is a spindle motor, and a motor 205 is the one to be used for a peripheral mechanism portion such as a draft mechanism portion. The spindle motor 105 and the motor 205 for the peripheral mechanism are directly connected to a spindle and to a peripheral mechanism as a direct driving system, and according to the scale of a spinning machine, they are provided one unit or a plurality of units respectively. Inverters 103 and 103B are respectively connected to a unit of spindle motor 105 or a plurality of spindle motors 105 and to a unit of motor 205 or a plurality of motors 205 for peripheral mechanism.

In the present embodiment, the constitution is similar to that of the third embodiment except that a converter 502 is commonly provided for inverters 103 and 103B, and a speed ratio circuit 113 is connected between the oscillator circuit 508B of the inverter 103B and the adder 142. In FIG. 3, a smoothing capacitor C of the DC circuit is omitted.

In the present embodiment too, the voltage of the DC circuits of the inverters 103 and 103B are detected and a feedback control is executed so that the voltage can be kept at a target voltage value even in a service interruption, and the speed instruction is corrected corresponding to the deviation voltage between the detected voltage and the target voltage.

In the present embodiment, a signal of a specified frequency is input to a PWM converter 509 from an oscillator 508 according to a speed instruction output form a speed setter 107, and from the PWM converter 509 a PWM signal is generated which makes the inverter 103 output an AC power having a voltage V1 and a frequency f1 corresponding to the speed instruction. Owing to this, the motor 105 is driven in a number of revolution corresponding to the speed instruction.

The speed instruction is supplied also to an oscillator 508B and to a PWM converter 509B through the speed ratio setter 113, and from the PWM converter 509B a PWM signal is output to make the inverter 103B output an AC power having a voltage V2 and a frequency f2 to make the ratio of the number of revolution of the motor 205 to the number of revolution of the motor 105 be a specified value; owing to this, the motor 205 is driving in a number of revolution of a speed ratio given by the speed ratio setter 113 for the speed instruction at the time. In the present embodiment, control is so executed that a specified relation between an instruction and an output can be realized in both voltage and frequency, that is, f1/f2=a constant, and V1/V2=a constant, and the motor 105 and the motor 205 are operated in synchronization with each other.

Because of this, even if the quantity of inertial energy GD maintained by the whole take-up mechanism including the spindle motor 105 is changed by the quantity of thread taken up by a spindle, being independent of the change, a control is automatically obtained which makes motors stop always keeping a proper speed ratio.

When power supply is recovered during a decelerating operation, that is, at the so called recovery of a service interruption, the recovery is detected by a service-interruption det.;ctor 116, and the output of the speed corrector 111 is made to zero by the operation of a switch S. Thereupon, the speed instruction returns to a value before the service interruption; in the result, motors 105 and 205 are accelerated again to be brought back to the number of revolution in the normal operating condition.

In the case of the re-acceleration, if a speed instruction rises stepwise, a too heavy current will flow int he motor and also the speed ratio of the motor 105 to the motor 205 will be deviated; therefore it is preferable to change a step-shaped output at a recovery of power to a ramp-shaped output by providing a mild acceleration/deceleration circuit 533 between the speed corrector 111 and the adder 142.

In the present embodiment, regenerative power is automatically controlled corresponding to the inertial quantity in a spindle driving system of a spinning machine; therefore, when the present embodiment is applied to a spinning machine of a direct driving system, etc., always an accurate cooperative stop control of rotational speed can be obtained; even in a service interruption, the operation at an accurate speed ratio is possible and even in the case of a sudden stop of power supply, the fear for the occurrence of thread cut, etc. can be completely eliminated; and the lowering of working ratio, the lowering of quality of products and so on can be sufficiently suppressed.

Figure 12:
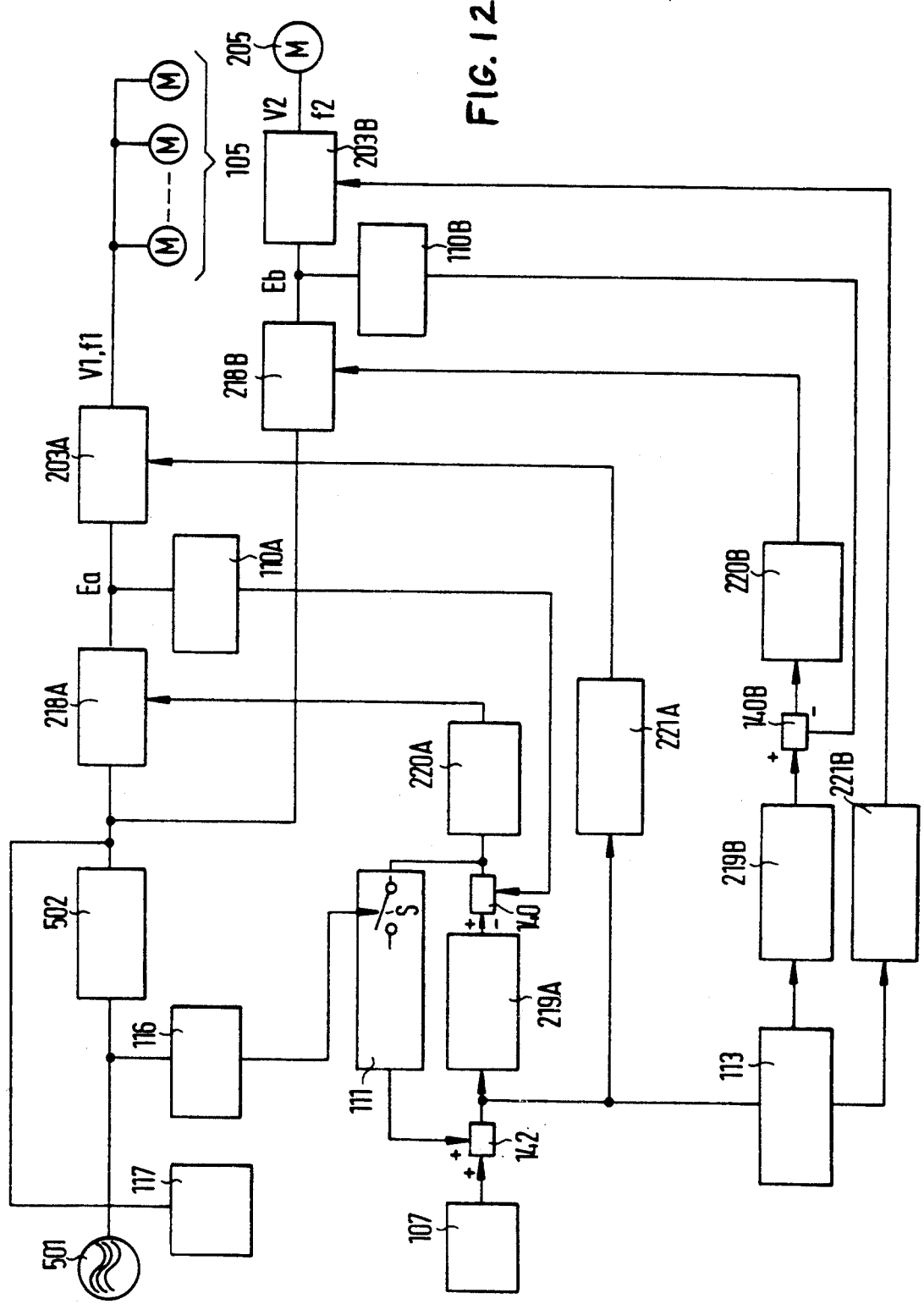
FIG. 12 is a block diagram showing the basic constitution of a fifth embodiment of the present invention.

A fifth embodiment according to the present invention will b explained referring to FIG. 12.

The present embodiment is an example in which an inverter of PAM system is used; in the figure 203A and 203B are inverters of PAM system, and the embodiment is so constituted that each of the motors 105 and 205 are driven by the above-mentioned inverters respectively.

In the case of an inverter of a PAM system, the control on the AC side voltage is executed by controlling a DC input voltage, so that following the converter 502, DC choppers 218A and 218B are provided respectively; the DC voltages Ea and Eb are controlled by the above-mentioned arrangement.

Under normal operating conditions: a voltage instruction output from a voltage setter 219 according to a speed instruction from the speed setter 107 and a detected voltage from the voltage detector 110 are compared; the deviation voltage is supplied to a chopper driving circuit 220A to control the chopper 218A so that the DC voltage Ea can be supplied to the inverter 203A; owing to this, on the AC side of the inverter 203A a voltage V1 corresponding to the speed instruction is obtained. The speed instruction is input also to a frequency setter 221A which functions as a first speed control means; thereby the frequency f1 on the AC side of an inverter 218A is controlled to be the one corresponding to the speed instruction. A feedback control means is substantially composed of a comparator 140 which compares the output of a voltage detector 110A and the output of a voltage setter 219A, and of a speed corrector 111 having a switch S.

The inverter 203B and the chopper 218B are controlled by a voltage setter 219B, a chopper driving circuit 220B and a frequency setter 221B to be able to supply a specified DC voltage Eb to the inverter 203B and also to be able to obtain a voltage V2 and a frequency f2 on the AC side of the inverter 203B; in this case, it is arranged that a speed instruction is input to the voltage setter 219B and the frequency setter 221B through a speed ratio setter 113; because of this the specified relations, f1/f2=a constant, V1/V2=a constant, are given.

Other operations than those mentioned in the above are similar to those in the fourth embodiment.

Therefore, in this embodiment too, always accurate cooperative stop operation of a rotational speed is automatically given, and even in the case of a sudden interruption of power supply caused by a service interruption, the fear of occurrence of thread cut, etc. can be removed completely, and the lowering of working ratio of a spinning machine or the lowering of product quality can be suppressed sufficiently.

Figure 13:
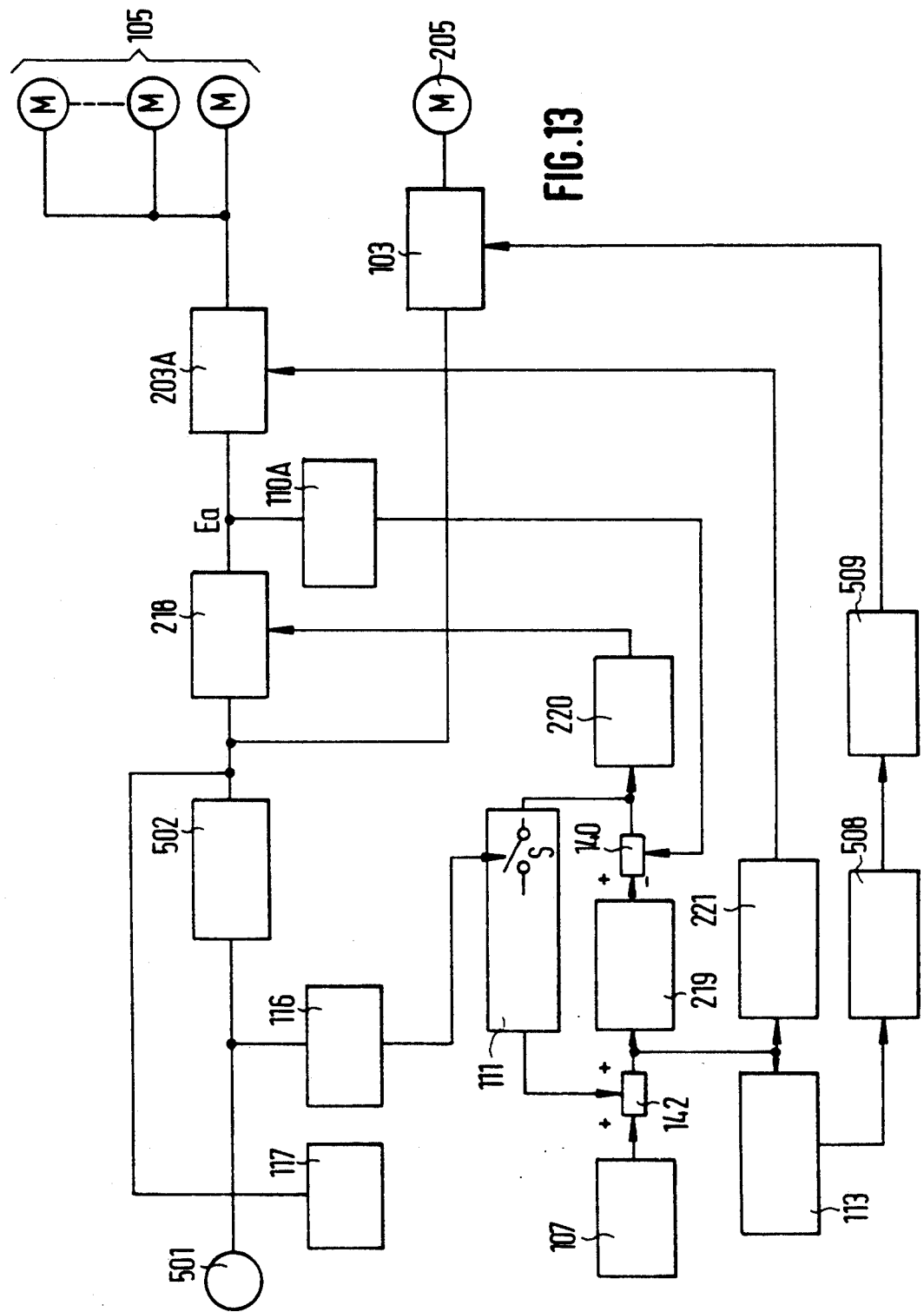
FIG. 13 is a block diagram showing the basic constitution of a sixth embodiment of the present invention.

A sixth embodiment according the present invention will be explained referring to FIG. 13. The present embodiment is a compromise system composed of the combination of the fourth embodiment and the fifth embodiment, in which a spindle driving motor 105 is driven by a PAM system inverter 203A, and a peripheral mechanism driving motor 205 is driven by a PWM system inverter 103. The other constitution than that mentioned in the above is similar to that of the fourth embodiment or of the fifth embodiment, and the operation of each of the constituent elements is also as explained in previous pages. In the present embodiment: a voltage detector 110 detects a voltage of the DC circuit of the inverter 203A and the voltage is compared with a voltage instruction value of the voltage setter 219A by a comparator 140 to output the deviation voltage; and the output is supplied to a speed corrector 111, and when the switch S is ON, the output of the speed corrector 111 is given as a correction signal. The correction signal is added to a speed instruction of the speed setter 107 to correct the speed instruction continuously; thereby the inverters 203A and 103 are made possible to control the speed of motors 105 and 205 continuously.

According to the present invention, regenerative power is automatically controlled corresponding to the inertia quantity in a spindle driving system of a spinning machine; therefore when the invention is applied to a spinning machine of a direct drive system etc.: always an accurate cooperative stop control of rotational speed can be obtained; even in a service interruption an operation in an accurate speed ratio is possible; even in a sudden interruption of power supply the fear of occurrence of thread cut etc. is completely removed; and the lowering of working ratio or the lowering of product quality, etc. can be sufficiently suppressed.

What is claimed is:

1. A motor control device comprising: an inverter whose DC side being connected to a power supply and to whose AC side being connected at least one motor; a speed setting means for giving a speed instruction to said inverter; a voltage detection means for detecting voltages on the DC side of said inverter; a target voltage generation means for generating a target voltage on the DC side of said inverter; a comparison means for comparing a voltage detected by said voltage detection means with the target voltage and for outputting a deviation voltage; a speed correction means for generating a speed correction signal changing continuously in connection with the output of said comparison means; and an adding means for adding the output of said speed correction means to the output of said speed setting means, wherein said speed correction means is provided with a proportional integration and differentiation element and generates said speed correction signal in connection with a deviation voltage by the proportional integration and differentiation operation and changes continuously the output of said speed setting means, and said motor is decelerated continuously keeping the voltage on the DC side of said inverter at the target voltage in a regenerative operation time of said motor.

2. A motor control device as set forth in claim 1, further comprising an oscillation means for supplying a signal having a frequency based on a signal of said speed setting means to the inverter, and a voltage regulation means provided between the DC side of said inverter and said power supply for supplying a voltage based on the signal of said speed setting means to said inverter, wherein the frequency of said oscillation means and the voltage of said voltage regulation means are corrected by a signal of said speed correction means.

3. A motor control device comprising: an inverter whose DC side being connected to a power supply and to whose AC side being connected at least one motor; a speed setting means for giving a speed instruction to said inverter; a voltage detection means for detecting voltages on the DC side of said inverter; a target voltage generation means for generating a target voltage on the DC side of said inverter; a comparison mean for comparing a voltage detected by said voltage detection means with the target voltage and for outputting a deviation voltage; a speed correction means for generating a speed correction signal changing continuously in connection with the output of said comparison means; and an adding means for adding the output of said speed correction means to the output of said speed setting means, wherein said speed correction means is provided with a proportional integration element and generates said speed correction signal in connection with a deviation by the proportional integration operation and changes continuously the output of said speed setting means, and said motor is decelerated continuously keeping the voltage on the DC side of said inverter at the target voltage in a regenerative operation time of said motor.

4. A motor control device comprising: a first inverter whose DC side being connected to a power supply and to whose AC side being connected at least one motor connected to a load with large inertia of a spinning machine; a second inverter whose DC side being connected to the DC side of said first inverter and to whose AC side being connected at least one other motor connected to a load with small inertia of the spinning machine; a speed setting means for giving a speed instruction to at least one of said first and second inverters; a service interruption detection means for detecting a service interruption of said power supply; a voltage detection means for detecting voltages on the DC side of said first and second inverters; a target voltage generation means for generating a target voltage on the DC side of said first and second inverters; a comparison means for comparing a voltage detected by said voltage detection means with the target voltage and for outputting a deviation voltage; a speed correction means being provided with a proportional integration and differentiation element for generating a speed correction signal changing continuously in connection with the output of said comparison means by the proportional integration and differentiation operation; and a speed ratio decision means for determining the speed ratio between said first inverter and said second inverter, wherein when said service interruption detection means detects a service interruption, the signal of said speed correction means is added to the output of said speed setting means, and said motors are decelerated keeping the voltage on the DC side of said first and second inverters at the target voltage and keeping the speed ratio unchanged in a regenerative operation time of said motors.

5. A motor control device as set forth in claim 4 further comprising a target voltage control means for controlling said target voltage generation means, wherein said target voltage control means raises the target voltage in the case of a large decrease in voltage on the DC side of said inverter in comparison to desired target voltage, and generates a correction signal to make said speed correction means increase the deceleration rate of said motors.

6. A motor control device comprising: a first inverter whose DC side being connected to a power supply and to whose AC side being connected at least one motor connected to a load with large inertia of a spinning machine; a second inverter whose DC side being connected to the DC side of said first inverter and to whose AC side being connected at least one other motor connected to a load with small inertia of the spinning machine; a first speed setting means for giving a speed instruction to said first inverter; a second speed setting means for giving a speed instruction to said second inverter; a service interruption detection means for detecting a service interruption of said power supply; a voltages detection means for detecting voltages on the DC side of said first and second inverters; a target voltage generation means for generating a target voltage on the DC side of said first and second inverters; a comparison means for comparing a voltage detected by said voltage detection means with the target voltage and for outputting a deviation voltage; and a speed correction means being provided with a proportional integration and differentiation element for generating a speed correction signal changing continuously in connection with the output of said comparison means by the proportional integration and differentiation operation; wherein voltages on the DC side of said first and second inverters are kept at the target voltage in a regenerative operation time of said motors.

7. A motor control device comprising: a first inverter whose DC side being connected to a power supply through a voltage regulating means and to whose AC side being connected at least one motor connected to a load with large inertia of a spinning machine; a second inverter whose DC side being connected to the same power supply as that of said first inverter and to whose AC side being connected at least one other motor connected to a load with small inertia of the spinning machine; a speed setting means for giving a speed instruction to said first and second inverters; a service interruption detection means for detecting a service interruption of said power supply; a voltages detection means for detecting voltages on the DC side of said first and second inverters; a target voltage generation means for generating a target voltage on the DC side of said first and second inverters; a comparison means for comparing a voltage detected by said voltage detection means with the target voltage and for outputting a deviation voltage; a speed correction means being provided with a proportional integration and differentiation element for generating a speed correction signal changing continuously in connection with the output of said comparison means by the proportional integration and differentiation operation, wherein when said service interruption detection means detects a service interruption, the signal of said speed correction means is added to the output of said speed setting means, and voltages on the DC side of said first and second inverters are kept at the target voltage in a regenerative operation time of said motors.

8. A motor control device comprising: a first inverter whose DC side being connected to a power supply and to whose AC side being connected at least one winding motor of a spinning machine; a second inverter whose DC side being connected to the DC side of said first inverter and to whose AC side being connected at least one feeding motor of the spinning machine; a speed setting means for giving a speed instruction to said first and second inverters; a service interruption detection means for detecting a service interruption of said power supply; a voltage detection means for detecting voltages on the DC side of said first and second inverters; a target voltage generation means for generating a target voltage on the DC side of said first and second inverters; a comparison means for comparing a voltage detected by said voltage detection means with the target voltage and for outputting a deviation voltage; a speed correction means being provided with a proportional integration and differentiation element for generating a speed correction signal changing continuously in connection with the output of said comparison means; and a speed ratio decision means for determining the speed ratio between said first inverter and said second inverter, wherein when said service interruption detection means detects a service interruption, the signal of said speed correction means is added to the output of said speed setting means, and said winding motor and said feeding motor are decelerated keeping voltages on the DC side of said first and second inverters at the target voltage and keeping the speed ratio unchanged.

9. A motor control device as set forth in claim 8, wherein said spinning machine is a ring fine spinning machine, said winding motor is a spindle motor, and said feeding motor is a peripheral device motor.

* * * * *